US 6,330,046 B1

(12) United States Patent
Ishitaka et al.

(10) Patent No.: US 6,330,046 B1
(45) Date of Patent: Dec. 11, 2001

(54) REFLECTION TYPE LIQUID CRYSTAL DISPLAY DEVICE WHEREIN THE ORGANIC FILM IS TERMINATED BEFORE EXTENDING INTO THE DRIVING ELEMENT MOUNTING REGION

(75) Inventors: Yoshihiko Ishitaka; Sadao Nakamura; Tatsuya Moriike, all of Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/487,156

(22) Filed: Jan. 19, 2000

(30) Foreign Application Priority Data

Jan. 26, 1999 (JP) .................................................. 11-017682

(51) Int. Cl.[7] ...................... G02F 1/1333; G02F 1/1345; G02F 1/1335
(52) U.S. Cl. .......................... 349/138; 349/149; 349/150; 349/113
(58) Field of Search ................................... 349/138, 149, 349/150, 151, 152, 113, 122

(56) References Cited

U.S. PATENT DOCUMENTS

| 4,666,254 | | 5/1987 | Itoh et al. ............................. 350/334 |
| 5,016,986 | * | 5/1991 | Kawashima et al. ............. 350/339 R |
| 5,317,438 | * | 5/1994 | Suzuki et al. ........................... 359/88 |
| 5,528,403 | * | 6/1996 | Kawaguchi et al. ................... 359/88 |
| 5,734,457 | | 3/1998 | Mitsui et al. ......................... 349/106 |
| 5,838,412 | * | 11/1998 | Ueda et al. ........................... 349/150 |
| 6,052,172 | * | 4/2000 | Kajiwara et al. .................... 349/152 |

FOREIGN PATENT DOCUMENTS

| 0 536 898 A1 | 9/1992 | (EP) . |
| 0 867 747 A2 | 3/1998 | (EP) . |
| 10-282521 | 10/1998 | (JP) . |

* cited by examiner

Primary Examiner—William L. Sikes
Assistant Examiner—Tarifur R. Chowdhury
(74) Attorney, Agent, or Firm—Brinks Hofer Gilson & Lione

(57) ABSTRACT

A highly reliable reflection type liquid crystal display device having an organic film is disclosed in which generation of cracks in an electrode layer caused by the sinking in of the terminals of a driving element are prevented. A reliable electrical connection is thereby established between the driving element and the first electrode layer and the organic film is prevented from being separated from the substrate. The reflection type liquid crystal display device includes a pair of substrates, a seal material held between the pair of substrates, and a liquid crystal layer sealed in the space surrounded by the pair of substrates and the seal material. The organic film, which has a plurality of protrusions and recesses, a metal reflection film, an overcoat film, and first electrode layers sequentially formed on the surface of one of the pair of substrates. The organic film and the metal reflection film are formed in a display region but are not formed in a driving element mounting region.

42 Claims, 12 Drawing Sheets

REFLECTION TYPE LIQUID CRYSTAL DISPLAY DEVICE WHEREIN THE ORGANIC FILM IS TERMINATED BEFORE EXTENDING INTO THE DRIVING ELEMENT MOUNTING REGION

BACKGROUND OF THE INVENTION

1. Field of the Invention

The present invention relates to a reflection type liquid crystal display device and, in particular, to a reflection type liquid crystal device superior in reliability and a method for manufacturing the same.

2. Description of the Related Art

Nowadays, a reflection type liquid crystal display device, which consumes relatively little power and which can be made small in thickness, is widely used as the display portion of a hand-held type computer or the like.

A known example of the reflection type liquid crystal display device is an outside type in which a reflection plate is arranged outside a pair of substrates provided on either side of a liquid crystal layer. However, in an outside type reflection type liquid crystal display device, the light entering the reflection type liquid crystal display device is reflected by a reflection film of the reflection plate after passing the two substrates, with the result that the bright display is rather dark.

To cope with this problem, there has been proposed a built-in type reflection type liquid crystal display device, in which there is arranged between a pair of substrates a reflection film whose surface is a mirror surface, and in which light is passed through only one substrate. However, in this reflection type liquid crystal display device, it is difficult to effectively utilize light, so that the contrast is rather low.

To eliminate this problem, there exists a built-in type reflection type liquid crystal display device as shown in FIG. 13, in which the metal reflection film for reflecting light has protrusions and recesses. In FIG. 13, numeral 1a indicates a first substrate, and FIG. 1b indicates a second substrate. On the surface of the second substrate 1b opposed to the first substrate 1a, there are formed second electrode layers 9b and a second orientation film 4b, and on the surface on the opposite side, a phase plate 5 and a polarizing plate 6 are sequentially stacked one upon the other. On the other hand, on the surface of the first substrate 1a opposed to the second substrate 1b, an organic film 44 having a large number of protrusions and recesses, a metal reflection film 54, an overcoat film 64, a first electrode layer 94a, and a first orientation film 4a are sequentially stacked one upon the other. The overcoat layer 64 is provided in order to flatten out the protrusions and recesses of the metal reflection layer 54, and to insulate the metal reflection film 54 from the electrode layer 94a. A liquid crystal layer 2 is sealed in the space surrounded the first substrate 1a and the second substrate 1b, having the above-mentioned layers, and a seal material held between them.

FIG. 14 is a plan view of the reflection type liquid crystal display device shown in FIG. 13, with the second substrate, the layers provided on the sides of the second substrate, the liquid crystal layer, the seal material, and the first orientation film being omitted. In FIGS. 13 and 14, numeral 7 indicates a driving element mounting region, and numeral 8 indicates a display region. Here, the driving element mounting region 7 is a region where a driving element is mounted, and the display region is a region used for the display of the liquid crystal display device.

As shown in FIGS. 13 and 14, on the overcoat film 64 of the driving element mounting region 7, there is mounted a driving element 16 through the intermediation of an anisotropic conductive film 10 (hereinafter referred to as "ACF" having a conductive filler 10a. The ACF 10 has a conductive filler 10a, and conductivity can be imparted thereto by heating and pressurizing it.

The first electrode layer 94a of the driving element mounting region 7 connected to the display region 8 is electrically connected to one terminal 11a of the driving element 16 through the intermediation of the ACF 10. Further, the other terminal 11b of t he driving element 16 is connected to the first electrode layer 94c through the intermediation of the ACF 10.

In this reflection type liquid crystal display device, to stack the organic film 44, the metal reflection film 54, and the overcoat film 64 on the surface of the first substrate 1a, a photosensitive resin liquid is first applied, as shown in FIG. 15, to the first substrate 1a, which consists of a transparent glass plate or the like, and this photosensitive resin liquid is pre-baked to form a photosensitive resin layer 44a. Next, the pattern surface of a transfer pattern 14 having a flat portion 14a in the periphery is pressed against the photosensitive resin layer 44a on the first substrate la for a fixed period of time to transfer the protrusions of the transfer pattern 14 to the surface of the photosensitive resin layer 44a of the display region 8 shown in FIG. 15, and, as shown in FIG. 16, a large number of protrusions are formed. After this, rays 20 such as ultraviolet rays (g, h and i-rays) are applied to the whole from the back side (the lower side as seen in the drawing) of the first substrate to cure the photosensitive resin layer 44b having a large number of protrusions and recesses. After this, the transfer pattern 14 is detached from the photosensitive resin layer 44b, and post-baking is performed to obtain the organic film 44 as shown in FIG. 17. Then, aluminum, silver or the like is vapor deposited on the display region 8 of the organic film 44 to form the metal reflection layer 54 as shown in FIG. 18. After this, the overcoat film 64 shown in FIG. 19 is formed by a thermosetting acrylic resin or the like.

As shown in FIG. 13, in this reflection type liquid crystal display device, the organic film 44, the overcoat film 64, the ACF 10, and the first electrode layers 94a and 94c are provided between the driving element 16 and the first substrate 1a. Being formed of an organic substance, the organic film 44 is very soft. Thus, there is a fear that the terminals 11a and 11b of the driving element 16 will sink in to generate cracks in the first electrode layers 94a and 94c when the driving element 16 is electrically connected to the first electrode layers 94a and 94c by heating and pressurizing the ACF 10. Further, due to the cracks, there is a fear that the first electrode layers 94a and 94c will suffer a break.

Further, it is difficult to bring the organic film 44 formed of a photosensitive resin into close contact with the first substrate 1a consisting of a glass plate. In particular, in the portion where it is exposed to the atmospheric air at the end surface of the reflection type liquid crystal display device, the organic film 44 takes up moisture, so that it is more liable to separation.

SUMMARY OF THE INVENTION

Accordingly, it is an object of the present invention to solve the above problems and provide a highly reliable reflection type liquid crystal display device in which it is possible to prevent the generation of cracks in the first electrode layers as a result of sinking in of the terminals of the driving element to thereby reliably establish electrical connection between the driving element and the first electrode layers, and in which it is possible to prevent the organic film from being separated from the substrate.

Another object of the present invention is to provide a method for manufacturing such a reflection type liquid crystal display device.

To achieve the above object, there is provided, in accordance with the present invention, a reflection type liquid crystal display device comprising a pair of substrates, a seal material held between the pair of substrates, and a liquid crystal layer sealed in the space surrounded by the pair of substrates and the seal material, wherein, on the surface of one of the pair of substrates opposed to the other substrate, there are sequentially formed an organic film having a large number of protrusions and recesses, a metal reflection film, an overcoat film, and an electrode layer, and wherein the organic film and the metal reflection film are formed excluding at least a driving element mounting region.

In the present invention, the "driving element mounting region" is a region where a driving element is mounted.

In this reflection type liquid crystal display device, the organic film and the metal reflection film are formed excluding at least the driving element mounting region, so that there is no soft organic film between the driving element and the substrate which mainly causes the sinking in of the driving element, whereby it is possible to prevent the generation of cracks in the electrode layer which are generated as a result of the sinking in of the terminal of the driving element. Thus, it is possible to provide a highly reliable reflection type liquid crystal display device which is capable of reliably establishing an electrical connection between the driving element and the electrode layer.

In the above reflection type liquid crystal display device, the overcoat film may be formed excluding at least the driving element mounting region.

In this reflection type liquid crystal display device, the electrode layer and the substrate are in direct contact with each other, and the crack generation is less likely to occur in the electrode layer, which occurs as a result of the terminal of the driving element sinking in. Further, since the electrode layer having a great affinity with the substrate is brought into direct contact with the substrate in the driving element mounting region, it is possible to prevent the organic film from being separated from the substrate.

Further, in the above reflection type liquid crystal display device, it is desirable for the organic film and the metal reflection film to be formed excluding the peripheral portion of one substrate and for the overcoat film to be formed so as to cover the end surface of the organic film.

In this reflection type liquid crystal display device, it is possible to cover the organic film having a poor affinity with the substrate with the overcoat film having a great affinity with the substrate, whereby it is possible to prevent the organic film from being separated from the organic film. Further, since the organic film is not exposed at the end surface of the reflection type liquid crystal display device, it is not exposed to the atmospheric air, so that there is no fear of the organic film absorbing moisture to become more liable to be separated. Thus, it is possible to provide a more reliable reflection type liquid crystal display device.

In the above reflection type liquid crystal display device, the electrode layer of the driving element mounting region is electrically connected to the driving element through the intermediation of an anisotropic conductive film having a conductive filler, and it is desirable for the thickness of the overcoat film to be not more than 2/3 of the grain diameter of the conductive filler.

In this reflection type liquid crystal display device, it is possible to reliably establish an electrical connection between the driving element and the electrode layer if the terminal of the driving element sinks in when mounting the driving element.

To achieve the above object, there is provided, in accordance with the present invention, a method for manufacturing a reflection type liquid crystal display device, comprising the steps of forming on a surface of a first substrate an organic film and a metal reflection layer which have a large number of protrusions and recesses excluding at least a driving element mounting region, sequentially stacking an overcoat layer and an electrode layer, holding a seal material between the first substrate and a second substrate to define a space surrounded by the first and second substrates and the seal material, and sealing a liquid crystal in the space to form a liquid crystal layer.

In this manufacturing method, the organic film and the metal reflection film are formed excluding at least the driving element mounting region, so that it is possible to obtain a reflection type liquid crystal display device superior in reliability.

In the above method for manufacturing a reflection type liquid crystal display device, it is possible to form the overcoat layer excluding at least the driving element mounting region. Further, it is desirable to form the organic film and the metal reflection film excluding the peripheral portion of the substrate and to form the overcoat film so as to cover the end surface of the organic film.

DESCRIPTION OF THE PREFERRED EMBODIMENT

The present invention will now be described in detail with reference to the drawings.

[First Embodiment]

Figure 1:
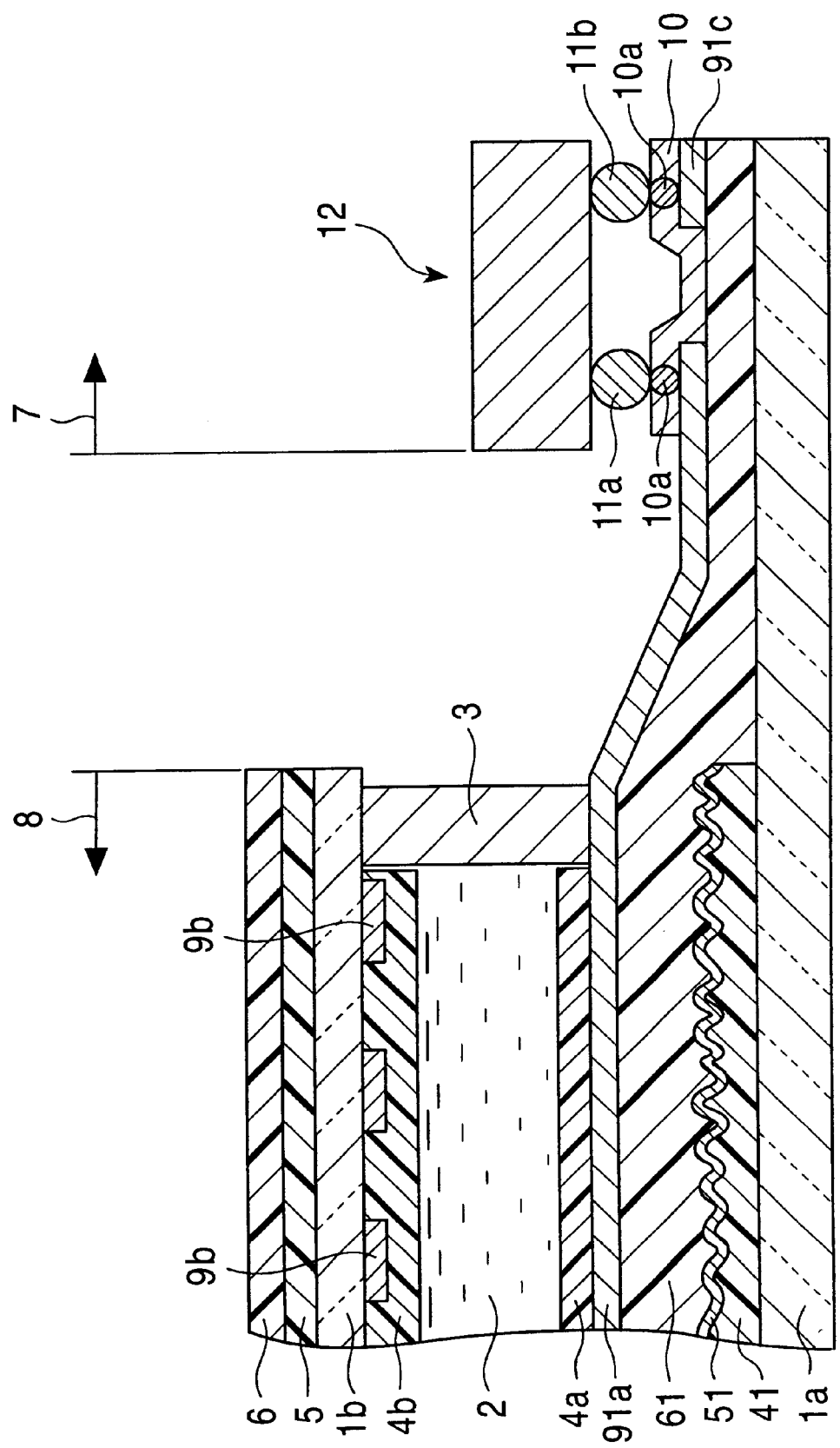
FIG. 1 is a sectional view showing a first embodiment of the reflection type liquid crystal display device of the present invention.

FIG. 1 is a diagram showing an example of the reflection type liquid crystal display device of the present invention. In FIG. 1, numeral 1a indicates a first substrate, and numeral 1b indicates a second substrate. On the surface of the second substrate 1b opposed to the first substrate 1a, there are sequentially formed second electrode layers 9b and a second orientation film 4b. On the surface on the opposite side, there are sequentially stacked a phase plate 5 formed of polycarbonate resin, acrylic resin or the like and a polarizing plate. On the surface of the first substrate 1a opposed to the second substrate 1b, there are sequentially stacked an organic film having a large number of protrusions and recesses 41, a metal reflection film 51, an overcoat film 61, a first electrode layer 91a, and a first orientation film 4a. A liquid crystal layer 2 is sealed in the space surrounded by the first substrate 1a and the second substrate 1b, with the above-mentioned layers formed on either side, and a seal material 3 held therebetween.

Figure 2:
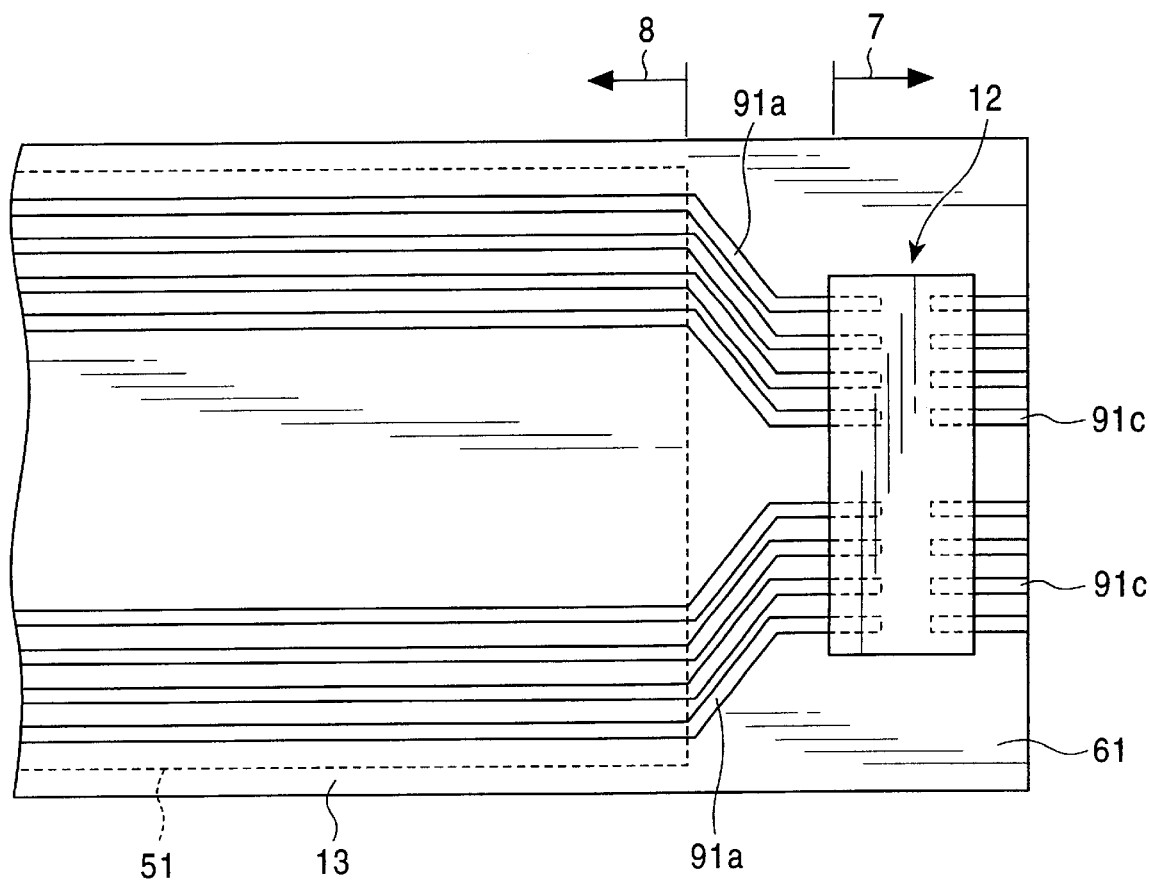
FIG. 2 is a plan view of a second substrate of the reflection type liquid crystal display device shown in FIG. 1, with each layer, a liquid crystal layer, a seal material and a first orientation film provided on either side of the second substrate being omitted.

FIG. 2 is a plan view of the second substrate of the reflection type liquid crystal display device shown in FIG. 1, with the layers provided on either side of the second substrate, the liquid crystal layer, the seal material and the first orientation film being omitted.

As shown in FIGS. 1 and 2, a driving element 12 is mounted on the overcoat film 61 in a driving element mounting region 7 through the intermediation of an ACF 10.

The first electrode layer 91a of the driving element mounting region 7, connected to a display region 8, is electrically connected to one terminal 11a of the driving element 12 through the intermedition of the ACF 10. Further, the other terminal 11b of the driving element 12 is connected to a first electrode layer 91c through the intermediation of the ACF 10.

The ACF 10 has a conductive filler 10a, and exhibits electrical conductivity when heated and pressurized. It is desirable that the grain diameter of the conductive filler 10a used in the ACF 10 be approximately 4 to 6 $\mu$m.

The first and second substrates 1a and 1b consist, for example, of transparent glass plates having a thickness of approximately 0.7 mm.

The first electrode layers 91a and 91c and the second electrode layer 9b are formed of ITO (indium-tin oxide) or the like. ITO is a material having a great affinity with the material of the first substrate 1a.

The material of the first orientation film 4a and the second orientation film 4b is obtained, for example, by rubbing a high molecular film formed of polyimide resin or the like.

As shown in FIGS. 1 and 2, the organic film 41 and the metal reflection film 51 are formed excluding the driving element mounting region 7 and the peripheral portion 13 of the first substrate 1a. Examples of the material of the organic film 41 include photosensitive resins such as acrylic type resist, polystyrene type resist, azido rubber type resist, and imide type resist. More specifically, CFPR017S (trade name, manufactured by Tokyo Oka Kogyo, Co., Ltd.), for example, is preferably used.

The metal reflection film 51 is formed of a metal such as aluminum or silver.

As shown in FIGS. 1 and 2, the overcoat film 61 is formed on the entire surface of the first substrate 1a, and covers the end surface of the organic film 41 and of the metal reflection film 51. The thickness of the overcoat film 61 is preferably not more than ⅔ of the grain diameter of the conductive filler 10a. When the thickness of the overcoat film 61 is more than ⅔ of the grain diameter of the conductive filler 10a, the terminals 11a and 11b of the driving element 12 will sink in, and there is a fear that the driving element 12 cannot be electrically connected to the first electrode layers 91a and 91c.

It is desirable that the material of the overcoat film 61 is one which is superior in affinity with the material of the first substrate 1a. For example, a thermosetting acrylic resin is used. More specifically, JSS984 (trade name, manufactured by JSR Co. Ltd.), for example, is preferably used.

In this reflection type liquid crystal display device, the organic film 41 and the metal reflection film 51 are formed excluding the driving element mounting region 7, so that between the first electrode layer 91a, 91c and the first substrate 1a, only the overcoat film 61 exists, which is harder as compared to the organic film 41, and there is no organic film 41, which is the main cause of the sinking in of the driving element, whereby it is possible to prevent generation of cracks in the first electrode layers 91a and 91c, which occurs as a result of the terminals 11a and 11b of the driving element 12 sinking in. Thus, it is possible to provide a highly reliable reflection type liquid crystal display device in which an electrical connection can be reliably established between the driving element 12 and the first electrode layers 91a and 91c.

Further, the organic film 41 and the metal reflection film 51 are formed excluding the peripheral portion 13 of the first substrate 1a, and the overcoat film 61 is formed so as to cover the end surfaces of the organic film 41 and the metal reflection film 51, so that it is possible to cover the organic film 41, which has a poor affinity with the first substrate 1a, with the overcoat film 61, which has great affinity with the first substrate 1a, whereby it is possible to prevent the organic film 41 from being separated from the first substrate 1a. Further, since the organic film 41 is not exposed at the end surface of the reflection type liquid crystal display device, it is not exposed to the atmospheric air, and the organic film 41 does not absorb moisture to become more liable to separate. Thus, it is possible to provide a highly reliable reflection type liquid crystal display device.

Further, by making the thickness of the overcoat film 61 not more than ⅔ of the grain diameter of the conductive filler 10a, the crack generation ratio of the first electrode layers 94a and 94c is reduced even if the terminals 11a and 11b sink in when mounting the driving element 12, and a break due to cracks does not easily occur in the first electrode layers 91a and 91c, whereby an action can be reliably established between the driving element 12 and the first electrode layers 94a and 94c.

A reflection type liquid crystal display device as shown in FIGS. 1 and 2 was produced, varying the thickness of the overcoat film 61 as shown in Table 1 and using an ACF 10 having a conductive filler 10a of 5 to 6 μm to examine the crack generation ratio and the break generation ratio of the first electrode layers 94a and 94c. The results are shown in Table 1 and FIG. 20.

TABLE 1

| Overcoat film thickness (μm) | Break generation ratio (%) | Crack generation ratio (%) |
| --- | --- | --- |
| 2 | 0 | 1 |
| 3 | 0 | 0.8 |
| 4 | 0 | 3 |
| 5 | 10 | 42 |
| 6 | 30 | 64 |

Figure 20:
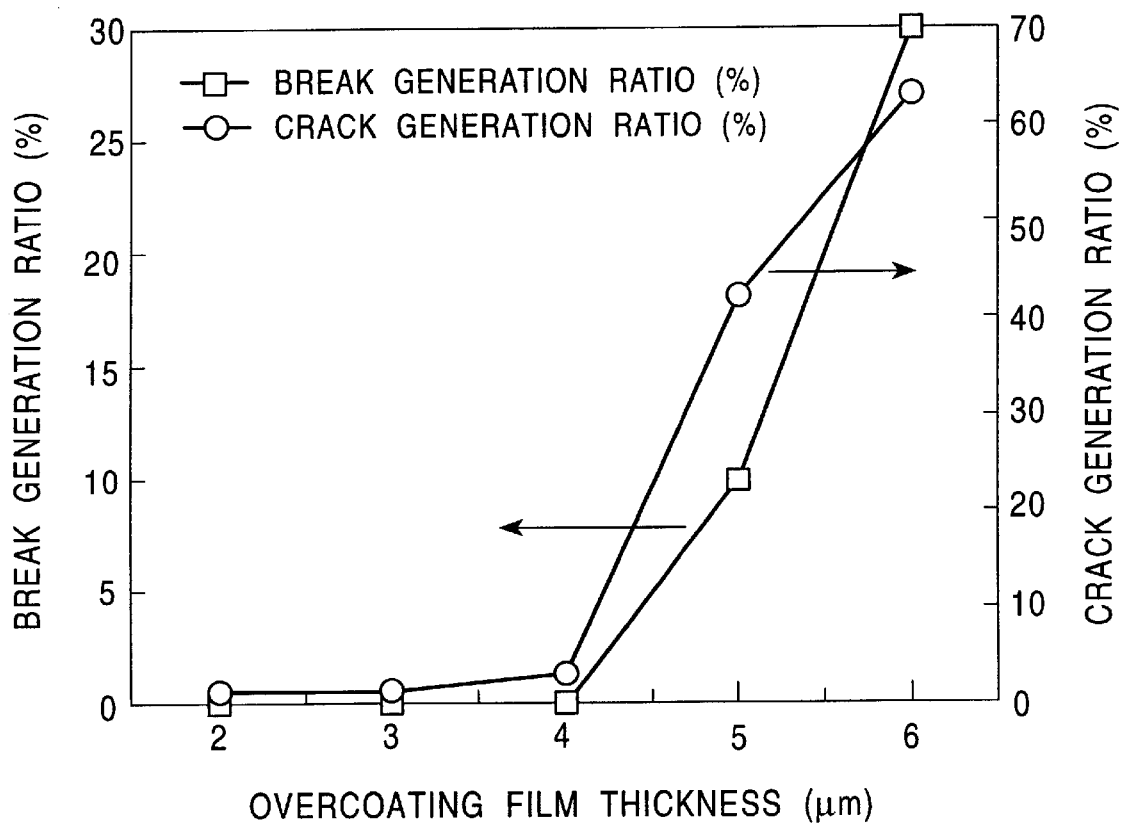
FIG. 20 is a graph showing the relationship between the thickness of the overcoat film and the crack generation ratio and the break generation ratio of the electrode layer.

As can be seen from Table 1 and FIG. 20, when the thickness of the overcoat film 61 is 4 μm or less, which is not more than ⅔ of the grain diameter of the conductive filler 10a the crack generation ratio is very low, with no break occurring.

Next, a method for manufacturing a reflection type liquid crystal display device as shown in FIGS. 1 and 2 will be described.

Figure 3:
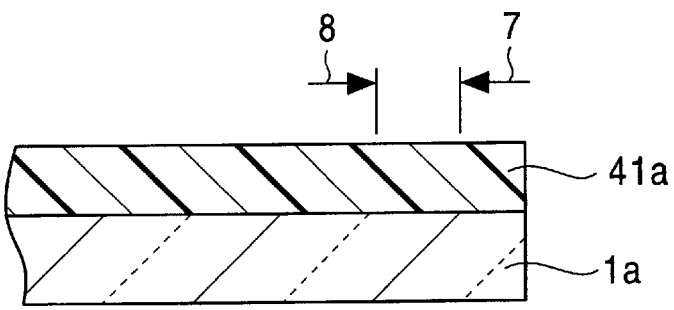
FIG. 3 is a diagram showing a manufacturing process for the reflection type liquid crystal display device shown in FIG. 1, showing a condition in which a photosensitive resin liquid has been applied.

First, as shown in FIG. 3, photosensitive resin liquid is applied to the first substrate 1a by spin coating, screen printing, spraying, etc. After the completion of the application, pre-baking is performed by using a heating device such as a heating furnace or a hot plate, heating the photosensitive resin liquid on the first substrate 1a in a temperature range, for example, of 80 to 100° C., for approximately 10 seconds to form a photosensitive resin layer 41a on the first substrate 1a. Since the pre-baking conditions differ according to the kind of photosensitive resin used, it is naturally possible to perform the processing at a temperature and for a period of time other than the above ranges. It is desirable for the thickness of the photosensitive resin layer 41a formed in this process to be in the range of 2 to 5 μm.

Figure 4:
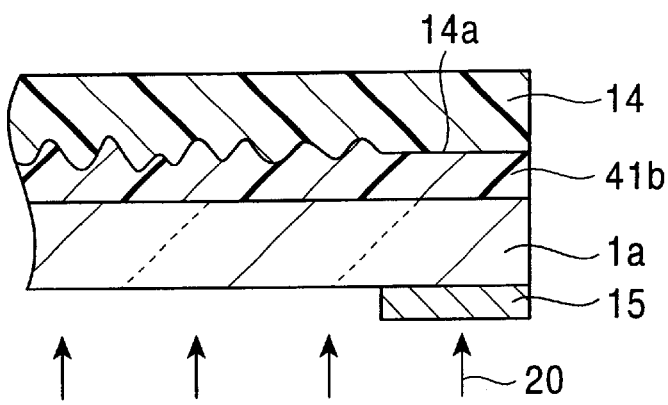
FIG. 4 is a diagram showing a manufacturing process for the reflection type liquid crystal display device shown in FIG. 1, showing how a transfer pattern is pressed and how rays are applied.

Subsequently, the pattern surface of a transfer pattern 14 having a flat portion 14a in the periphery is pressed against the photosensitive resin layer 41a on the first substrate 1a for a fixed period of time, and the protrusions of the pattern surface are transferred to the surface of the photosensitive resin layer 41a in the display region 8 shown in FIG. 3 to form a large number of recesses as shown in FIG. 4. For the pressing pressure at the time of pressing, it is desirable to select a value in conformity with the kind of photosensitive resin. For example, it may be a pressure of approximately 30 to 50 kg/cm². Regarding the pressing time also, it is desirable to select a value in conformity with the kind of photosensitive resin, for example, in the range of approximately 30 seconds to 10 minutes.

Figure 8A:
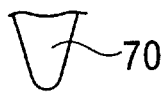
FIGS. 8A–8D diagram showing an example of a process for forming a transfer pattern.
Figure 8B:
Figure 8C:
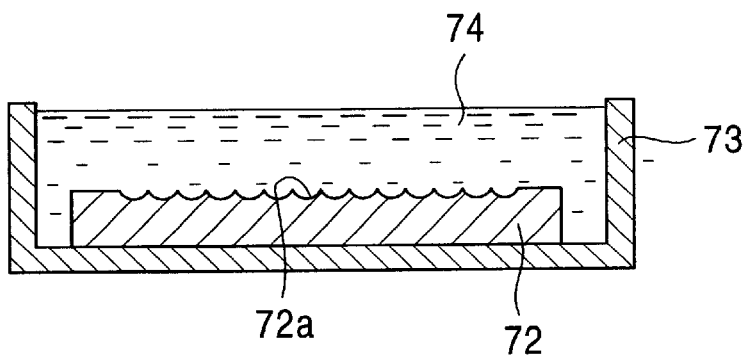
Figure 8D:
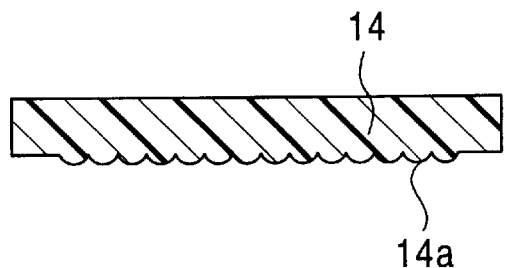

The transfer pattern 14 used, which is shown in FIG. 8D, is obtained as follows: a diamond indenter 70 whose forward end portion is formed in a spherical configuration having a predetermined diameter R is pressed against the surface of the display region 8 forming portion of a flat matrix base 71 as shown, for example, in FIG. 8A, which is formed of brass, stainless steel, tool steel or the like, to form a large number of recesses 72a differing in depth and pitch, and a reflection member forming matrix 72 as shown in FIG. 8B is obtained. Then, as shown in FIG. 8C, the matrix 72 is accommodated and arranged in a box-shaped container 73, and a resin material 74 such as silicone is poured into the container, the resin material being allowed to stand and cured at room temperature to form a large number of protrusions and recesses reverse to the recesses 72a. The cured resin product is extracted from the container 73, and the unnecessary portion is cut off to thereby obtain the transfer pattern 14.

Next, the portion including the driving element mounting region 7 and the peripheral portion 13 of the first substrate 1a and excluding the display region 8 is covered with a photo mask 15, and, to cure the photosensitive resin layer 41b, on which a large number of protrusions and recesses, rays 20 such as ultraviolet rays (g, h and i-rays) are applied from the back side (the lower side as seen in the drawing) of the first substrate 1a, as shown in FIG. 4. When the photosensitive resin as mentioned above is used, the strength of the rays 20 applied such as ultraviolet rays is sufficient when it is approximately 50 to 100 mJ/cm². However, it is naturally possible to apply the rays with a strength outside this range depending upon the kind of photosensitive resin. After the photosensitive resin layer 41 with a large number of protrusions and recesses has been cured, the photo mask 15 is removed.

Figure 5:
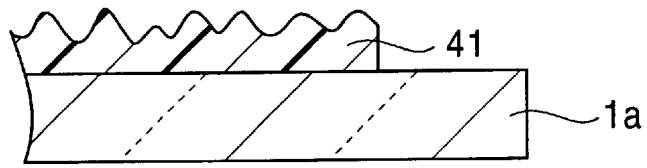
FIG. 5 is a diagram showing a manufacturing process for the reflection type liquid crystal display device shown in FIG. 1, showing the condition of the organic film after development.

Then, the transfer pattern 14 is removed from the photosensitive resin layer 41b, and development is performed for approximately one minute using a developer such as N-A3K (trade name, manufactured by Tokyo Oka Kogyo, Co., Ltd.), rinsing it for approximately one minute in pure water. Then, using a heating device such as a heating furnace or a hot plate which is the same as that used in the pre-baking, the photosensitive resin layer 41b with a large number of protrusions and recesses is subjected to post-baking, in which it is heated for approximately 30 minutes at a temperature, for example, of approximately 240° C. to thereby obtain the organic film 41 as shown in FIG. 5.

Figure 6:
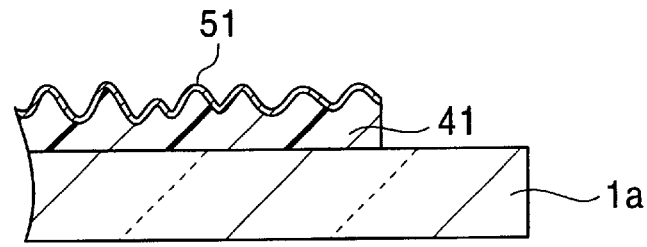
FIG. 6 is a diagram showing a manufacturing process for the reflection type liquid crystal display device shown in FIG. 1, showing how a metal reflection film is formed on the organic film.

Subsequently, an aluminum film, for example, is formed on the surface of the organic film 41 by electron beam evaporation or the like, with the portion of the first substrate 1a where no organic film 41 is formed being covered with a mask material, which is then removed, whereby the reflection film 51 is formed in conformity with the recesses of the surface of the organic film 41 as shown in FIG. 6.

Figure 7:
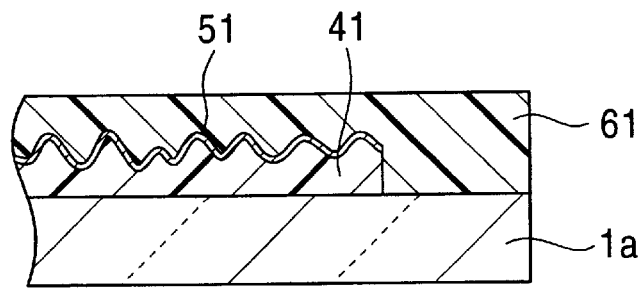
FIG. 7 is a diagram showing a manufacturing process for the reflection type liquid crystal display device shown in FIG. 1, showing the condition in which an overcoat film has been formed.

After this, as shown in FIG. 7, a thermosetting acrylic resin or the like is applied to the entire surface of the first substrate 1a by spin coating at approximately 1000 rpm for approximately 10 seconds. The resin thus applied is heated for approximately 30 minutes at a temperature, for example, of 230° C. to cure it, whereby the overcoat film 61 is formed such that it covers the upper surface of the reflection film 51 and the end surface of the organic film 41 and of the reflection film 51. It is desirable that the thickness of the overcoat film 61 be not more than ⅔ of the grain diameter of the conductive filler 10a used in the ACF 10.

Further, on the surface of the first substrate 1a, on which the organic film 41, the metal reflection film 51, and the overcoat film 61 have been formed, a first electrode layer 91a and a first orientation film 4a are sequentially formed.

Subsequently, on the surface of the second substrate 1b opposed to the first electrode layer 91a, second electrode layers 9b and a second orientation film 4b are sequentially formed, and on the surface on the other side of the second substrate, a phase plate 5 and a polarizing plate 6 are sequentially formed.

Then, with the first electrode 91a side and the second electrode 9b side being opposed to each other, a seal material 3 is held between the first substrate 1a and the second substrate 1b to define a space surrounded by the first substrate 1a, the second substrate 1b and the seal material 3, and a liquid crystal is sealed in the space to form a liquid crystal layer 2, whereby a reflection type liquid crystal display device is obtained.

While, as described above, in the reflection type liquid crystal display device of the present invention, the overcoat film 61 may be formed on the entire surface of the first substrate 1a, it is also possible to form the overcoat film 62, 63 excluding the driving element mounting region 7 as in the second and third embodiments of the present invention shown in FIGS. 9 through 12.

[Second Embodiment]

Figure 9:
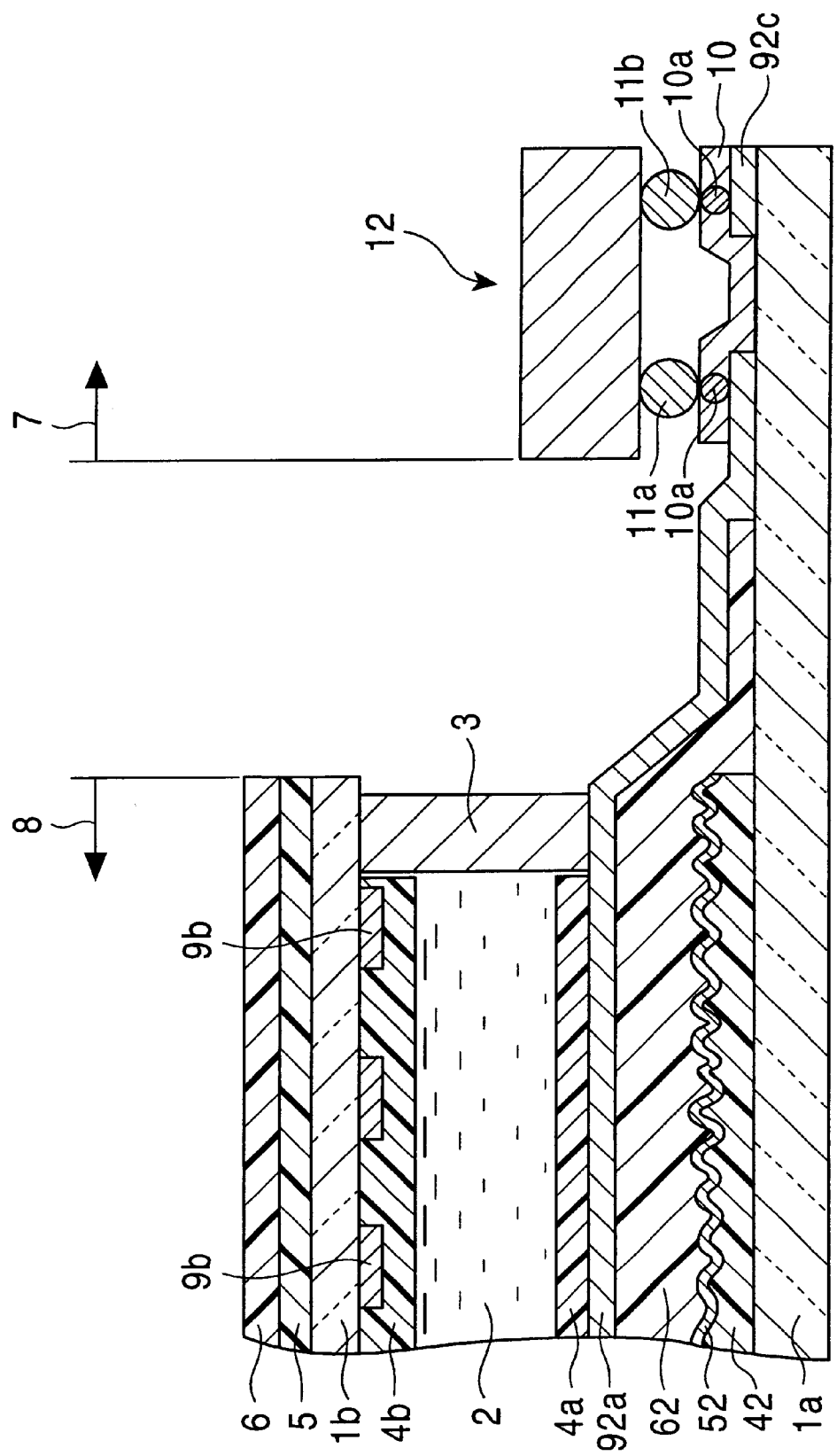
FIG. 9 is a sectional view showing a second embodiment of the reflection type liquid crystal display device of the present invention.
Figure 10:
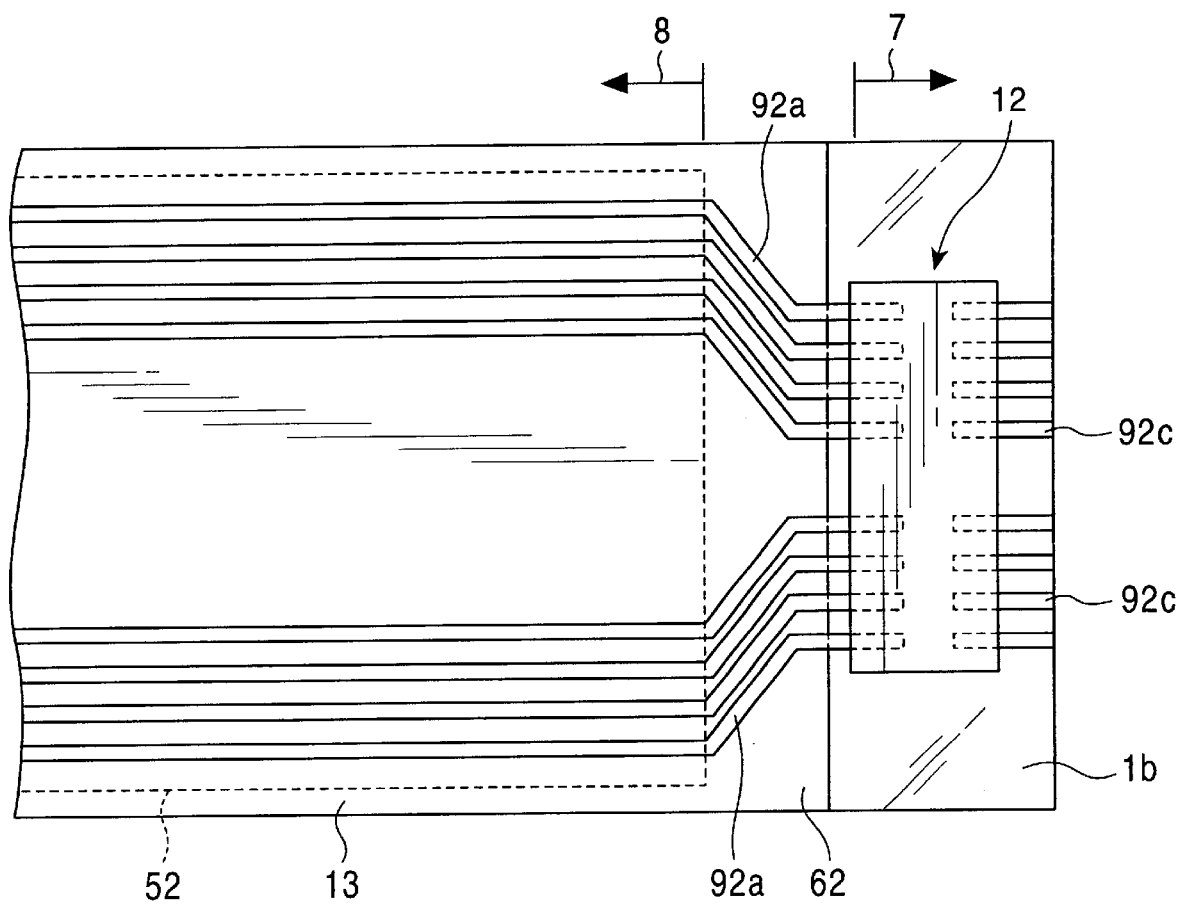
FIG. 10 is a plan view of a second substrate of the reflection type liquid crystal display device shown in FIG. 9, with each layer, a liquid crystal layer, a seal material, and a first orientation film being omitted.

As in the reflection type liquid crystal display device shown in FIGS. 1 and 2, in the reflection type liquid crystal display device of the second embodiment shown in FIGS. 9 and 10, the organic film 42 and the and the metal reflection film 52 are formed excluding the driving device mounting region 7 and the peripheral portion 13 of the first substrate 1a, and the overcoat film 62 is formed such that it covers the end surface of the organic film 42 and of the metal reflection film 52.

In the reflection type liquid crystal display device shown in FIGS. 9 and 10, the overcoat film 62 is formed excluding the driving element mounting region 7, so that the first electrode layers 92a and 92c are brought into direct contact with the first substrate 1a, and cracks due to the sinking in of the terminals 11a and 11b of the driving element 12 are less likely to be generated in the first electrode layers 92a and 92c. Further, since the first electrode layers 92a and 92c formed of ITO or the like, which has great affinity with the first substrate 1a, are brought into direct contact with the first substrate 1a in the driving element mounting region 7, it is possible to prevent the organic film 42 from being separated from the first substrate 1a.

Further, since the overcoat film 62 is formed such that it covers the end surface of the organic film 42 and of the metal reflection film 52, the organic film 42 is less likely to be separated from the first substrate 1a.

[Third Embodiment]

Figure 11:
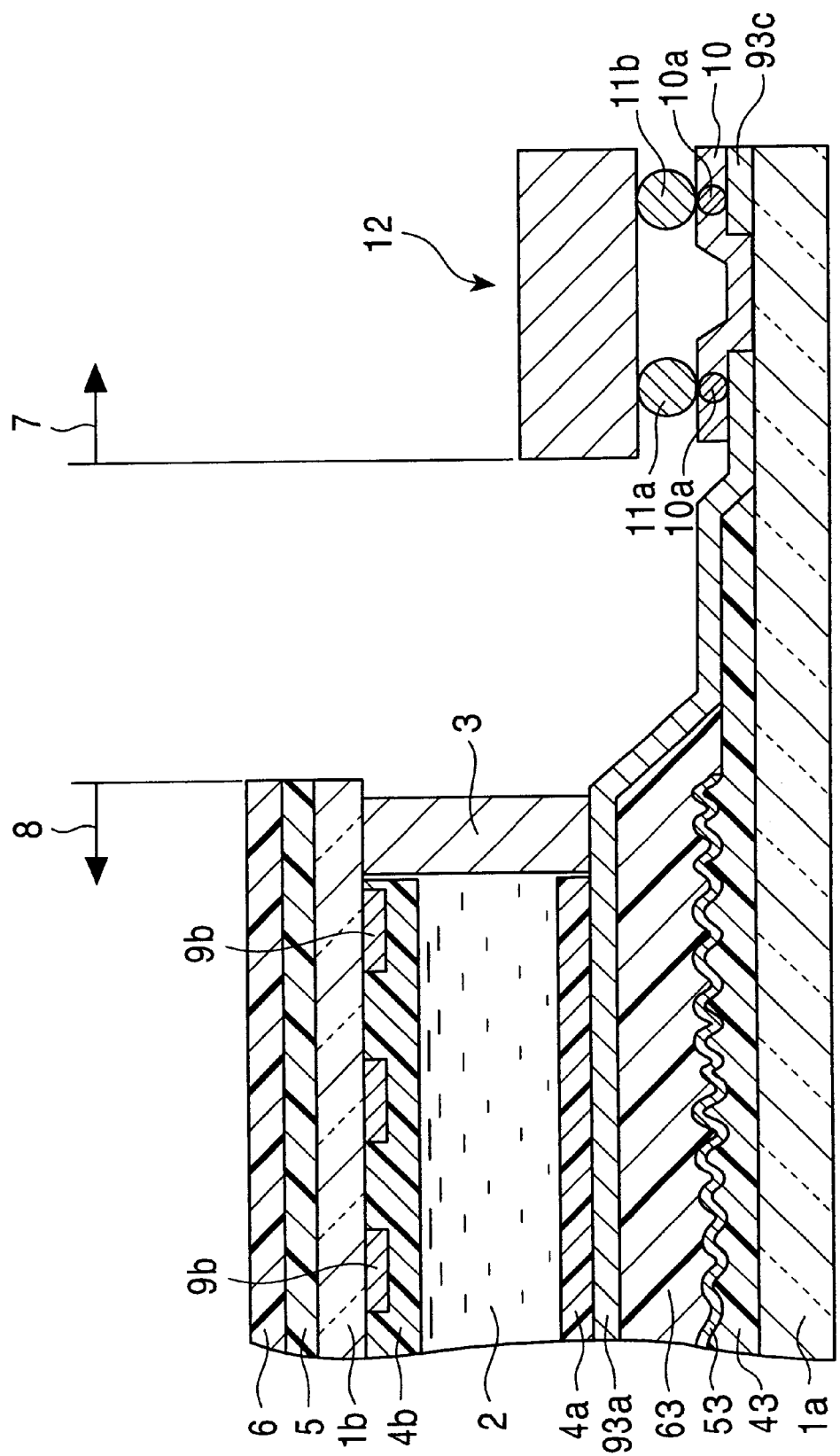
FIG. 11 is a sectional view showing a third embodiment of the reflection type liquid crystal display device of the present invention.
Figure 12:
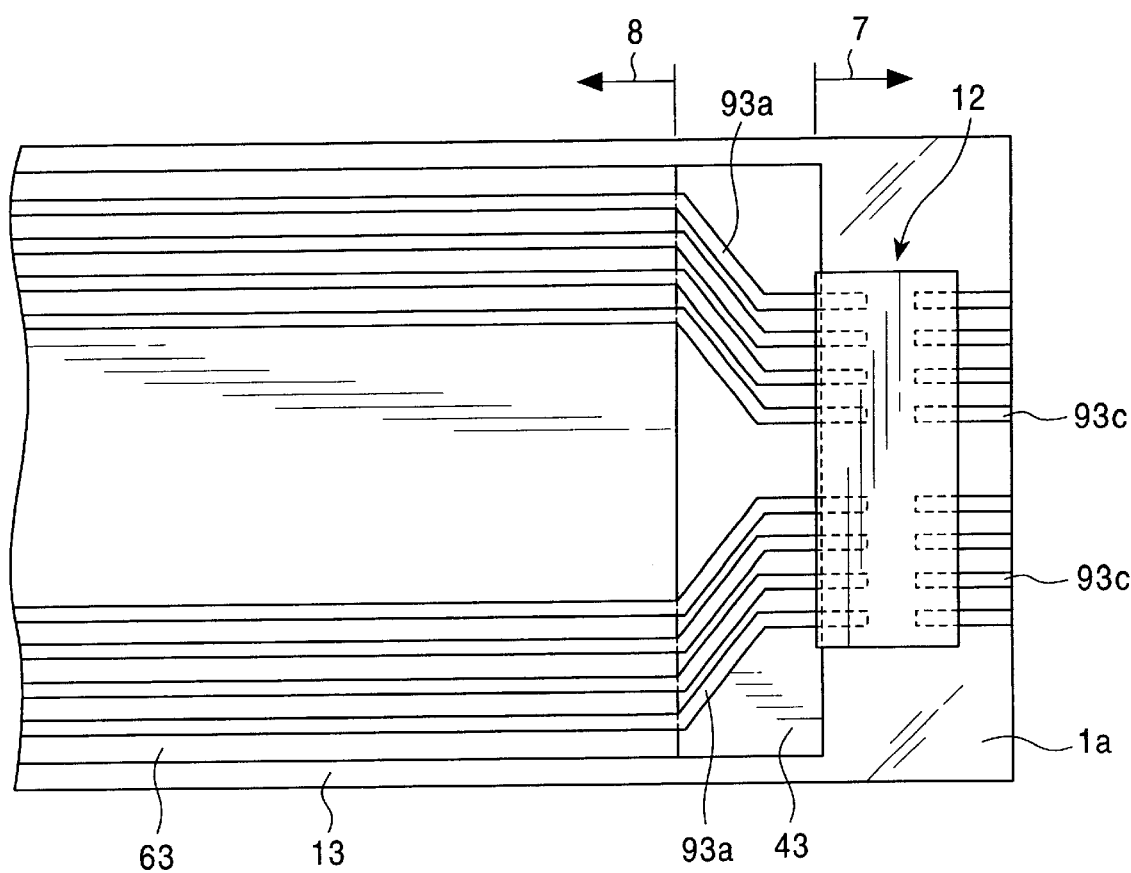
FIG. 12 is a plan view of a second substrate of the reflection type liquid crystal display device shown in FIG. 11, with each layer, a liquid crystal layer, a seal material, and a first orientation film being omitted.
Figure 13:
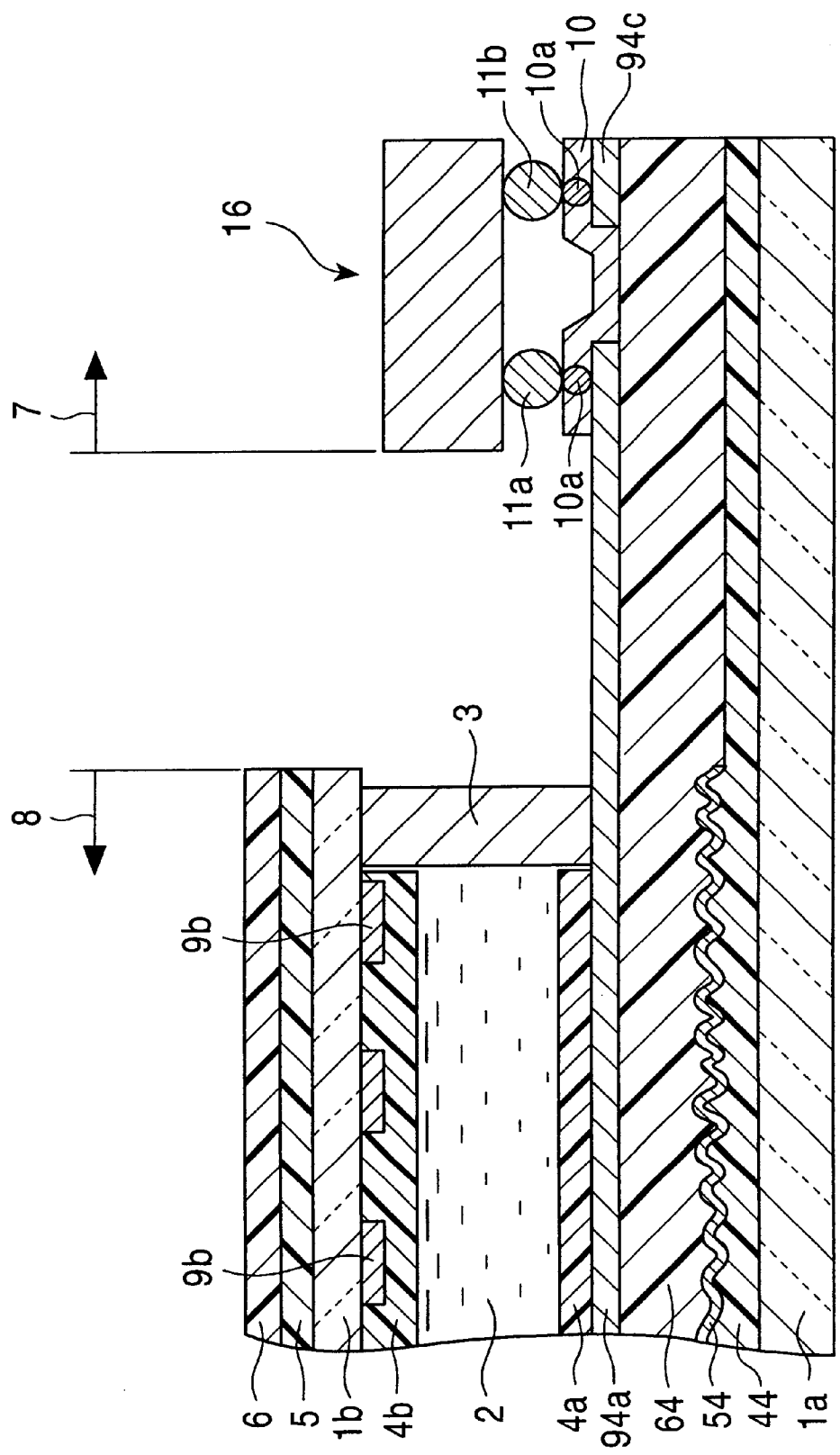
FIG. 13 is a diagram showing an example of a conventional reflection type liquid crystal display device.
Figure 14:
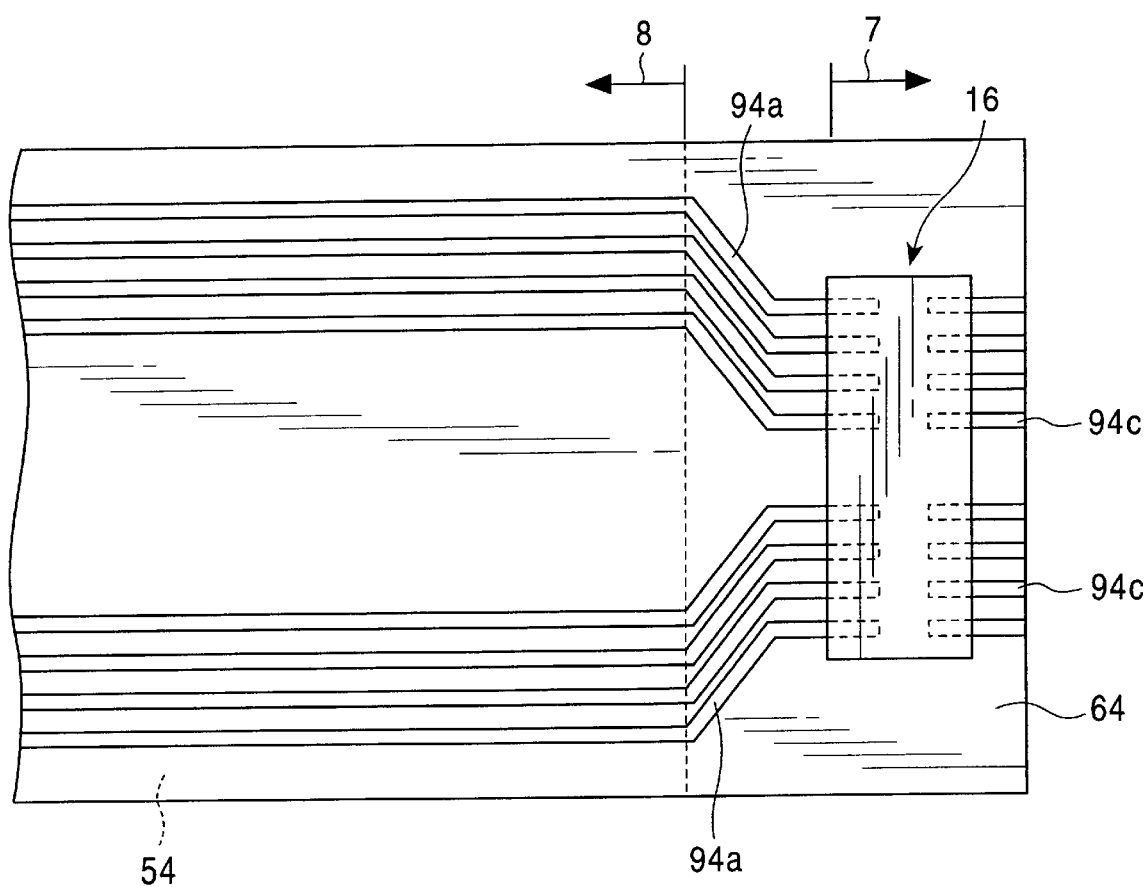
FIG. 14 is a plan view of a second substrate of the reflection type liquid crystal display device shown in FIG. 13, with each layer, a liquid crystal layer, a seal material, and a first orientation film being omitted.
Figure 15:
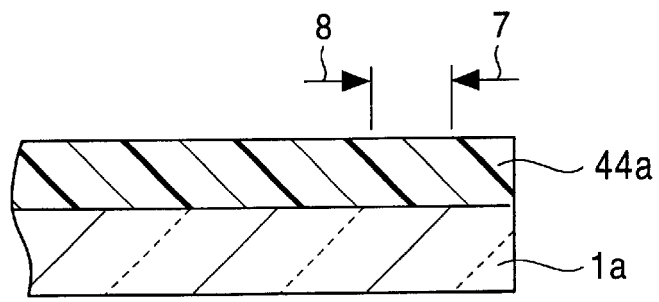
FIG. 15 is a diagram showing a manufacturing process for the reflection type display device shown in FIG. 13, showing a condition in which a photosensitive resin liquid has been applied to a first substrate.
Figure 16:
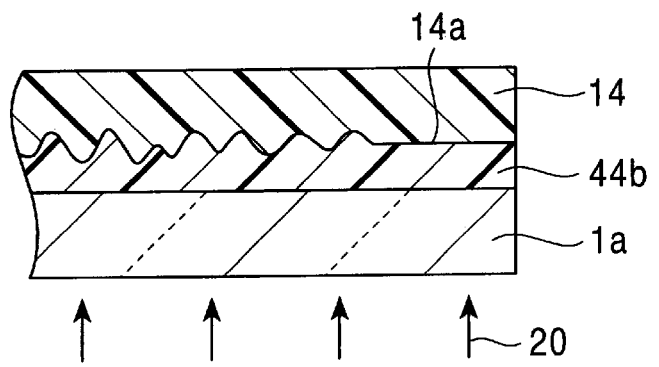
FIG. 16 is a diagram showing a manufacturing process for the reflection type display device shown in FIG. 13, showing how a transfer pattern is pressed and how rays are applied.
Figure 17:
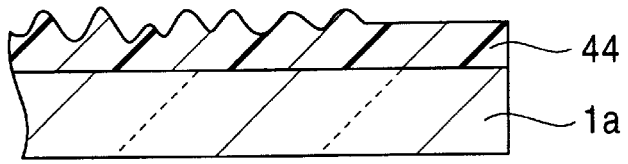
FIG. 17 is a diagram showing a manufacturing process for the reflection type display device shown in FIG. 13, showing the condition of the organic film after development.
Figure 18:
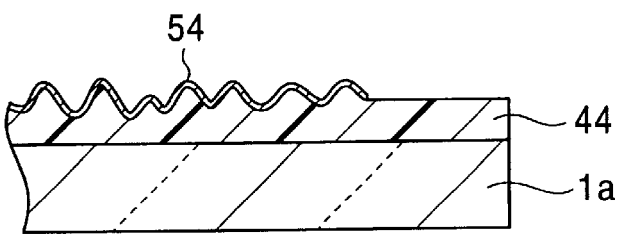
FIG. 18 is a diagram showing a manufacturing process for the reflection type display device shown in FIG. 13, showing how a metal reflection film is formed on the organic film.
Figure 19:
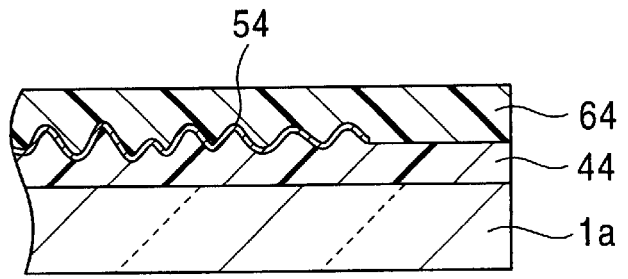
FIG. 19 is a diagram showing a manufacturing process for the reflection type display device shown in FIG. 13, showing the condition in which the overcoat film has been formed.

In the reflection type liquid crystal display device of the third embodiment shown in FIGS. 11 and 12, the organic film 43, the metal reflection film 53, and the overcoat film 63 are formed excluding the driving element mounting region 7 and the peripheral portion 13 of the first substrate 1a, and the organic film 43 is provided not only in the display region 8 but also in the region between the display region and the driving element mounting region 7.

As in the reflection type liquid crystal display device shown in FIGS. 9 and 10, in the reflection type liquid crystal display device shown in FIGS. 11 and 12, the overcoat film 63 is formed excluding the driving element mounting region 7, so that the driving element 12 is brought into direct contact with the first substrate 1a, with the result that cracks are less likely to be generated in the first electrode layers 93a and 93c. Further, since the first electrode layers 93a and 93c, which have great affinity with the first substrate 1a, are brought into direct contact with the first substrate 1a in the driving element mounting region 7, it is possible to prevent the organic film 43 from being separated from the first substrate 1a.

In the reflection type liquid crystal display device of the present invention, it is possible to provide a color filter in the reflection type liquid crystal display device, thereby making it possible for the liquid crystal display device to perform color display.

As described above in detail, in the reflection type liquid crystal display device of the present invention, the organic film and the metal reflection film are formed excluding at least the driving element mounting region, so that there is no soft organic film, which is the main cause of the sinking in of the driving element, between the driving element and the substrate, whereby it is possible to prevent generation of cracks in the electrode layer which are generated due to the sinking in of the driving element.

Further, by forming the organic film and the metal reflection film excluding the peripheral portion of the substrate and by forming the overcoat film such that it covers the end surface of the organic film and of the metal reflection film, it is possible to cover the organic film, which has poor affinity with the substrate, with the overcoat film, which has great affinity with the substrate, whereby it is possible to prevent the organic film from being separated from the substrate.

Further, the thickness of the overcoat film is not more than ⅔ of the grain diameter of the conductive filler used in the ACF, whereby it is possible to reliably establish an electrical connection between the driving element and the electrode layer even if the terminals of the driving element sink in when mounting the driving element.

Furthermore, by forming the overcoat film excluding at least the driving element mounting region, the electrode layer comes into direct contact with the substrate, and cracks in the electrode layer are less likely to be generated, which are due the sinking in of the terminals of the driving element. Further, since the electrode layer, which has great affinity with the substrate, is brought into direct contact with the substrate in the driving element mounting region, it is possible to prevent the organic film from being separated from the substrate.

What is claimed is:

1. A reflection type liquid crystal display device comprising:
    a display region comprising:
        an upper substrate and a lower substrate;
        an organic film having protrusions and recesses disposed above the lower substrate;
        a reflection film disposed above the lower substrate;
        an overcoat layer disposed above the lower substrate;
        a seal material disposed between the upper and lower substrates; and
        a liquid crystal layer sealed in a space surrounded by the upper and lower substrates and the seal material, the liquid crystal layer disposed above the reflection film;
    a driving element mounting region comprising:
        the lower substrate; and a driving element disposed above the lower substrate; and an electrode disposed above the lower substrate, the electrode extending between the driving element mounting region and the display region, the organic film terminating before extending between the driving element and the lower substrate.

2. The reflection type liquid crystal display device of claim 1, the reflection film disposed above the organic film and the overcoat layer disposed above the reflection film.

3. The reflection type liquid crystal display device of claim 2, the driving element mounting region further comprising the overcoat layer disposed between the driving element and the lower substrate.

4. The reflection type liquid crystal display device of claim 2, the overcoat layer covering an end of the organic film.

5. The reflection type liquid crystal display device of claim 2, the driving element mounting region further comprising an anisotropic conductive film having a conductive filler with a grain diameter, the anisotropic conductive film being disposed between the lower substrate and the driving element and electrically connected with the electrode and the driving element.

6. The reflection type liquid crystal display device of claim 5, the anisotropic conductive film being disposed between the lower substrate and the overcoat layer.

7. The reflection type liquid crystal display device of claim 5, a thickness of any of the overcoat layer disposed between the lower substrate and the anisotropic conductive film being not greater than $2/3$ of the grain diameter of the conductive filler of the anisotropic conductive film.

8. The reflection type liquid crystal display device of claim 5, the anisotropic conductive film comprising a material that exhibits electrical conductivity when heated and pressurized.

9. The reflection type liquid crystal display device of claim 5, a portion of the anisotropic conductive film adjacent with the lower substrate.

10. The reflection type liquid crystal display device of claim 9, the overcoat layer covering an end of the organic film.

11. The reflection type liquid crystal display device of claim 9, the organic film extending underneath the overcoat layer and an end of the organic film disposed more proximate to the driving element mounting region than an end of the overcoat layer.

12. The reflection type liquid crystal display device of claim 9, an end of the organic film disposed more distal to the driving element mounting region than an end of the overcoat layer.

13. The reflection type liquid crystal display device of claim 2, an end of the organic film disposed approximately at an end of the display region.

14. The reflection type liquid crystal display device of claim 2, an end of the organic film disposed approximately at an end of the driving element mounting region.

15. The reflection type liquid crystal display device of claim 2, an end of the overcoat layer disposed approximately at an end of the driving element mounting region.

16. The reflection type liquid crystal display device of claim 2, the display region further comprising a lower orientation film disposed below the liquid crystal layer and an upper orientation film disposed above the liquid crystal layer.

17. The reflection type liquid crystal display device of claim 2, the display region further comprising a phase plate disposed above the liquid crystal layer.

18. The reflection type liquid crystal display device of claim 2, the display region further comprising a polarization plate disposed above the liquid crystal layer.

19. The reflection type liquid crystal display device of claim 2, the reflection film comprising a metal film.

20. The reflection type liquid crystal display device of claim 2, the organic film comprising a photosensitive resin.

21. The reflection type liquid crystal display device of claim 2, further comprising a color filter disposed above the liquid crystal layer.

22. A reflection type liquid crystal display device comprising:

a display region including:
an upper substrate and a lower substrate;
an organic film having protrusions and recesses disposed above the lower substrate;
a reflection film disposed above the lower substrate;
an overcoat layer disposed above the lower substrate;
a seal material disposed between the upper and lower substrates; and
a liquid crystal layer sealed in a space surrounded by the upper and lower substrates and the seal material, the liquid crystal layer disposed above the reflection film;

a driving element mounting region including:
the lower substrate; and
a driving element disposed above the lower substrate; and
an electrode disposed above the lower substrate, the electrode extending between the driving element mounting region and the display region, the organic film terminating before extending into the driving element mounting region.

23. The reflection type liquid crystal display device of claim 22, the reflection film disposed above the organic film and the overcoat layer disposed above the reflection film.

24. The reflection type liquid crystal display device of claim 23, the driving element mounting region further comprising the overcoat layer disposed between the driving element and the lower substrate.

25. The reflection type liquid crystal display device of claim 23, the overcoat layer covering an end of the organic film.

26. The reflection type liquid crystal display device of claim 23, the driving element mounting region further comprising an anisotropic conductive film having a conductive filler with a grain diameter, the anisotropic conductive film being disposed between the lower substrate and the driving element and electrically connected with the electrode and the driving element.

27. The reflection type liquid crystal display device of claim 26, the anisotropic conductive film being disposed between the lower substrate and the overcoat layer.

28. The reflection type liquid crystal display device of claim 26, a thickness of any of the overcoat layer disposed between the lower substrate and the anisotropic conductive film being not greater than $2/3$ of the grain diameter of the conductive filler of the anisotropic conductive film.

29. The reflection type liquid crystal display device of claim 26, the anisotropic conductive film comprising a material that exhibits electrical conductivity when heated and pressurized.

30. The reflection type liquid crystal display device of claim 26, a portion of the anisotropic conductive film adjacent with the lower substrate.

31. The reflection type liquid crystal display device of claim 30, the overcoat layer covering an end of the organic film.

32. The reflection type liquid crystal display device of claim 30, the organic film extending underneath the overcoat layer and an end of the organic film disposed more proximate to the driving element mounting region than an end of the overcoat layer.

33. The reflection type liquid crystal display device of claim 30, an end of the organic film disposed more distal to the driving element mounting region than an end of the overcoat layer.

34. The reflection type liquid crystal display device of claim 23, an end of the organic film disposed approximately at an end of the display region.

35. The reflection type liquid crystal display device of claim 23, an end of the organic film disposed approximately at an end of the driving element mounting region.

36. The reflection type liquid crystal display device of claim 23, an end of the overcoat layer disposed approximately at an end of the driving element mounting region.

37. The reflection type liquid crystal display device of claim 23, the display region further comprising a lower orientation film disposed below the liquid crystal layer and an upper orientation film disposed above the liquid crystal layer.

38. The reflection type liquid crystal display device of claim 23, the display region further comprising a phase plate disposed above the liquid crystal layer.

39. The reflection type liquid crystal display device of claim 23, the display region further comprising a polarization plate disposed above the liquid crystal layer.

40. The reflection type liquid crystal display device of claim 23, the reflection film comprising a metal film.

41. The reflection type liquid crystal display device of claim 23, the organic film comprising a photosensitive resin.

42. The reflection type liquid crystal display device of claim 23, further comprising a color filter disposed above the liquid crystal layer.

* * * * *